PULSE CONVERTER
Filed Sept. 26, 1958
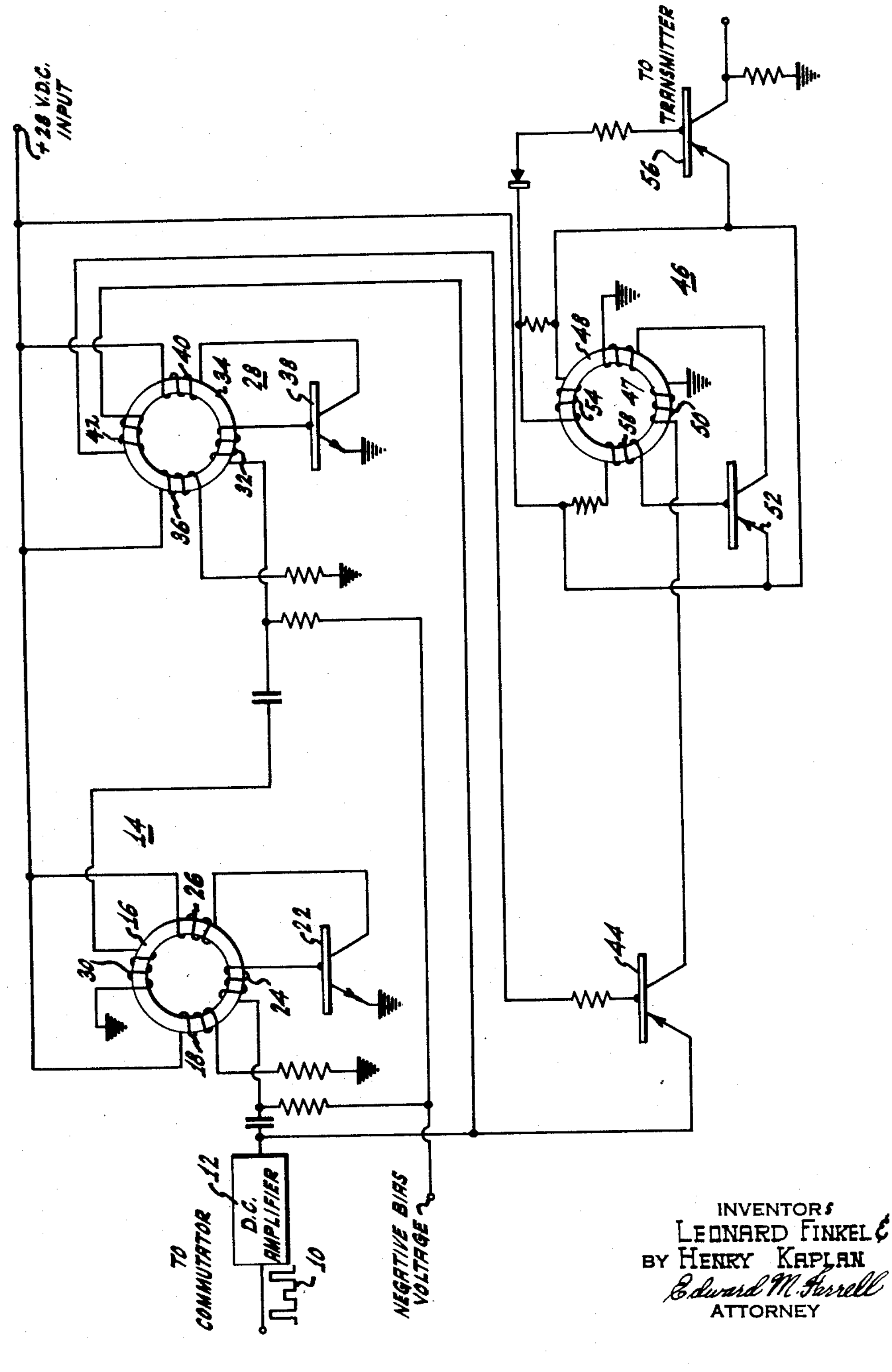
INVENTORS
LEONARD FINKEL &
BY HENRY KAPLAN
Edward M. Farrell
ATTORNEY United States Patent Office 2,956,244

Patented Oct. 11, 1960

2,956,244

PULSE CONVERTER

Leonard Finkel, Haddonfield, N.J., and Henry Kaplan, Broomall, Pa., assignors, by mesne assignments, to American Bosch Arma Corporation, Hempstead, N.Y., a corporation of New York Filed Sept. 26, 1958, Ser. No. 763,715

7 Claims. (Cl. 332—1)

This invention relates to pulse converter circuits, and more particularly to circuits for converting pulse amplitude modulated signals into corresponding pulse width modulated signals.

A large number of airborne telemetry systems utilize time multiplexing to provide means for transmitting maximum information within a limited bandwidth. For example, measurements from transducers, which may vary from 0 to 5 volts, are sequentially sampled with the output signals from transducers being utilized to modulate a subcarrier oscillator or the carrier of a transmitter.

In some cases, it is desirable to modulate the carrier signal of a transmitter by pulses of varying widths rather than pulses of varying amplitudes. In this case, the amplitude modulated pulses from the transducers are translated into corresponding variable width pulses which are used to modulate the frequency of a subcarrier oscillator or a transmitter.

In time multiplex systems, the initial rise time of sampled pulses may be accompanied by "spikes" or other spurious signals. This condition is particularly evident when mechanical commutators are employed to perform the sampling operation since such commutators generally involve contact resistance between brush members and contacts, bouncing brushes or sources of noise. For these and other reasons, it is desirable to eliminate the initial portions of sampled pulses before using such pulses to modulate the carrier of a transmitter. Delay gate signals of constant width generated by the commutated information signals from the transducers in conjunction with appropriate circuitry are generally employed for this purpose.

With the advent of missile development, demands for telemetry circuits of extremely compact size with minimum power requirements without sacrificing reliability have increased greatly. Since pulse converter circuits must be physically incorporated into missiles, it is important that these circuits be small, compact, require minimum power and offer maximum reliability.

It is an object of this invention to provide an improved pulse converter circuit of compact size with minimum power requirements.

It is a further object of this invention to provide an improved pulse width modulator of compact size in which spurious signals are eliminated from sampled signals.

In accordance with the present invention, a pulse converter circuit is provided. During gating signals of uniform time intervals, amplitude modulated pulse signals are applied to a winding of a square hysteresis loop magnetic core, which is normally maintained in a saturated region. The amplitude modulated signals partially switches the flux from one saturated region towards the opposite saturated region with the change in flux being directly proportional to the applied voltage. The core is switched to its original operating state at the end of each pulse to produce output pulses of variable widths corresponding to the pulse amplitude modulated signals. A square loop hysteresis magnetic core and associated circuitry are utilized to produce the gating signals after a time delay introduced by another square hysteresis loop magnetic core circuitry.

Other objects and advantages of the present invention will be apparent and suggest themselves to those skilled in the art to which the present invention is related, from a reading of the following specification and claims in conjunction with the accompanying drawing, in which the sole figure illustrates a schematic diagram of a pulse width modulator in accordance with the present invention.

Referring to the sole figure of the drawing, a series of amplitude modulated pulses 10 are applied to a direct current amplifier which is illustrated by a box 12. These pulses may be commutated information pulses variable between zero and five volts, for example. The output voltage from the direct current amplifier 12 is applied to a delay pulse generator 14, which includes a square hysteresis loop magnetic core 16. Such cores are well known to those skilled in the art. In the embodiment shown, the core 16 is set to the negative saturated region by means of a direct current flow through a bias winding 18 from a voltage source, indicated as B+.

The pulses 10 are applied to a differentiating circuit to produce positive trigger pulses corresponding to the leading edges of the pulse 10. The positive trigger pulses are applied to the base of a transistor 22 illustrated as being of the NPN type, through a winding 24. The base current of the transistor resulting from the trigger pulse causes an amplified current in a winding 26 which is connected in series with the collector of the transistor 22. The current in the winding 26 oppositely poled from winding 18 drives the core 16 towards its positive saturated region. The voltage developed across the winding 26 is regeneratively coupled back to the base circuit of the transistor 22 through the winding 24 with the result that the transistor 22 quickly "bottoms." The voltage from the B+ source then appears across the winding 26, and the core 16 switches to its positive saturated region. The switching time is dependent upon the applied voltage and the saturation flux density of the core 16. At the instant the core 16 saturates, regeneration stops and the core is returned to its negative saturated region by means of the current flowing in the bias winding 18. Thus, a square output pulse is obtained during the time the core 16 switches from its negative to positive saturated region.

The duration of the pulse is determined by the time required for the core to reach saturation. Since the flux in the core may be represented by the well-known relationship $$\Delta\phi=\frac{k}{n}\int_0^t v\,dt$$

Since $v$ is a constant $$\Delta\phi=\frac{kv}{n}t$$

and therefore $$t=\frac{n2\phi_s}{k}=\frac{2B_sAn}{kv}$$

Where $B_s$=saturation flux density of core in gauss.
$A$=cross sectional area of core in square cm.
$n$=number of turns.
$k=10^{-8}$.
$v$=voltage in volts.
$t$=switching time in seconds.

The time to reach saturation may be readily calculated for a given core and winding configuration, and applied voltage. In this core a fixed constant voltage is applied, providing a fixed delay pulse duration. A negative operating potential is applied to the base of the transistor 22, as indicated. This tends to prevent false triggering from noise.

The output square wave signals from a winding 30 are then differentiated. Pulses corresponding to the trailing edges of the square output pulses from the delay pulse generator 14 are applied to a winding 32 to trigger a gate pulse generator 28. The operation of the gate pulse generator 28 is substantially similar to the operation of the delay pulse generator 14. The pulse generator 28 includes a square hysteresis loop magnetic core 34. The core is set to its negative saturated region by means of a direct current flowing through a bias winding 36 from the B+ source. The trigger pulses corresponding to the trailing edges of the pulses from the delay pulse generator 14 are applied to the base of a transistor 38, of the NPN type, through the input winding 32 to cause a current to flow in the collector of the transistor 38 which is connected in series with the winding 40. The current in the winding 40 is regeneratively coupled to winding 32 sustaining the collector current until the core 34 is driven to its positive saturated region. The voltage developed across the winding 40 is essentially the B+ voltage, since the transistor is "bottomed" by the regenerative action. This B+ voltage which appears across the winding 40, switches the core 34 to its positive saturated region. When the core 34 saturates, regeneration stops and the core 34 is returned to its negative saturated region by means of the current flowing in the bias winding 36. Thus, a square output pulse is obtained during the time the core 34 switches from the negative to the positive saturated region. The source of negative operating potential is connected to the base of the transistor 38, as indicated to prevent false triggering from noise.

The output voltage from the winding 42 of the gate pulse generator is applied to a gating transistor 44 of the PNP type. The gating transistor 44 "bottoms" when a gating pulse is applied thereto. During the gating interval, pulse amplitude signals are applied from the direct current amplifier 12 through the transistor 44 to the pulse modulator circuit 46. The transistor 44 is normally non-conducting and becomes conducting during the gating intervals.

The pulse modulator circuit 46 includes a square hysteresis loop magnetic core 48. In the quiescent state, the flux in the core 48 is in the positive saturated region. The output pulse signals from the D.C. amplifier, corresponding to the pulses 10, are applied to the winding 50 partially switching the flux towards the negative saturated region, the change in flux being directly proportional to the applied voltage and to the gating time of the pulse generator.

At the end of the gating time, the collector current in the gating transistor 44 drops to zero and produces a "kick back" voltage in the base circuit of a transistor 52, of the PNP type. This voltage acts as a trigger pulse to produce a square wave output voltage across an output winding 54. A winding 47 is provided for regenerative feedback to the winding 58. The core 48 is then switched back to its positive saturated region by means of a fixed voltage. Since the change in flux in resetting the core 48 to the positive saturation region is the same as that produced during the gating time by the D.C. amplifier output voltage, the output pulse width applied to a transistor 56 is directly and linearly proportional to the output voltage of the direct current amplifier 12.

The output signals from the output winding 54 is applied to a transistor 56 of the PNP type, which emplifies the pulse width modulated signals which may then be applied to frequency modulate the carrier of a subcarrier oscillator.

The principle of operation of the modulator circuit may, therefore, be concisely stated as the formation of a voltage-time product (flux in core) at constant time (sampling interval), and the production of an output pulse having the same voltage time product, but produced at constant voltage. The duration of the output pulse is thereby made proportional to the voltage during the sampling interval.

While particular types of transistors have been illustrated, it is apparent that other types may be employed with some modifications of the polarities and values of the applied operating voltages.

The pulse width modulator shown in extensively compact and accurate and ideally suited for airborne telemetry. The use of the novel and compact time delay and gate generator circuits makes it possible to eliminate noise and other spurious signals associated with the initial rise time of commutated information signals.

What is claimed is:

1. A circuit for translating amplitude modulated signals into corresponding pulse width modulated signals comprising a square loop hysteresis magnetic core, means for biasing said magnetic core to provide a flux to operate said core in a saturated region, a gate generator circuit for producing constant width gate signals, a delay circuit, means for applying said amplitude modulated signals to said delay circuit to produce a series of trigger pulses delayed in time with respect to said amplitude modulated signals, means for applying said trigger pulses to said gate generator circuit to produce said constant width signals, means for applying said amplitude modulated signals to said magnetic core to drive said magnetic core away from its saturated region during said gate signals, and means for switching said magnetic core back to its original saturated region at the end of said gate signals to provide pulse width modulated signals variable in accordance with the amplitude of said amplitude modulated signals.

2. A circuit for translating amplitude modulated signals into corresponding pulse width modulated signals comprising a magnetic core having a rectangular hysteresis loop characteristic with a saturated region of operation, means for biasing said magnetic core to provide a flux to operate said core in said saturated region, a gate generator circuit for producing constant width gate signals, a delay circuit, means for applying said amplitude modulated signals to said delay circuit to produce a series of trigger pulses delayed in time with respect to said amplitude modulated signals, means for applying said delayed trigger pulses to said gate generator to produce said constant width gate signals, means for applying said amplitude modulated signals to said magnetic core to drive said magnetic core away from said saturated region during said gate signal intervals, a utilization circuit, means for applying an output signal from said magnetic core to said utilization circuit and means for switching said magnetic core back to its original saturated region to provide pulse width modulated signals at said utilization circuit variable in accordance with the amplitude of said amplitude modulated signals.

3. A circuit for translating amplitude modulated signals into corresponding pulse width modulated signals comprising a square loop hysteresis magnetic core, means for biasing said magnetic core to provide a flux to operate said core in a saturated region, a gate generator circuit responsive to trigger pulses to produce constant width gate signals, a delay circuit, means for applying said amplitude modulated signals to said delay circuit to produce a series of trigger pulses delayed in time with respect to said amplitude modulated signals, means for applying said trigger signals to said gate generator circuit to produce said constant width gate signals, means for applying said amplitude modulated signals to said magnetic core to drive said magnetic core away from its saturated region during said gate signals, a utilization circuit, means for applying an output signal from said magnetic core to said utilization circuit, and means for switching said magnetic core back to its original saturated region to provide pulse width modulated signals at said utilization circuit variable in accordance with the amplitude of said amplitude modulated signals.

4. A circuit for translating amplitude modulated signals into corresponding pulse width modulated signals comprising a square loop hysteresis magnetic core, means for biasing said magnetic core to provide a flux to operate said core in the positive saturated region, a gate generator circuit for producing constant width gate signals, a delay circuit to produce a series of trigger pulses delayed in time with respect to said amplitude modulated signals, means for applying said delayed trigger pulses to said gate generator to produce said constant width gate signals, means for applying said amplitude modulated signals to said magnetic core to drive said magnetic core towards its negative saturated region during said gate signals, a utilization circuit, means for applying an output signal from said magnetic core to said utilization circuit, and means for switching said magnetic core back to its positive saturated region to provide pulse signals at said utilization circut variable in width in accordance with said amplitude modulated signals.

5. A circuit for translating pulse amplitude modulated signals into corresponding pulse width modulated signals comprising a magnetic core having a rectangular hysteresis loop characteristic with a saturated region of operation, means for biasing said magnetic core to provide a flux to operate said core in said saturated region, a gate generator circuit including a saturable reactor and a transistor circuit to produce constant width gate signals, a delay circuit including a saturable reactor and a transistor circuit means for applying said amplitude modulated signals to said delay circuit to produce a series of trigger pulses delayed with respect to saaid amplitude modulated signals, means for applying said series of trigger signals to said gate generator to produce delayed gate signals, a gating circuit including a transistor, means for applying said gate signals to said gating circuit, means for applying said amplitude modulated signals through said gating circuit during the gate signal intervals to said magnetic core to drive said magnetic core away from said saturated region, a utilization circuit, means for applying an output signal from said magnetic core to said utilization circuit, and means for switching said magnetic core back to its original saturated region at the end of each pulse amplitude modulated signal to provide pulse width modulated signals at said utilization circuit variable in accordance with the amplitude of said amplitude modulated signals.

6. A pulse converter circuit comprising a source of pulse amplitude modulated signals, a pulse delay generator including a first magnetic core having a rectangular hysteresis loop characteristic with two saturated regions of operation, means for applying said pulse amplitude modulated signals to produce output pulses from said first magnetic core with the leading edges of said pulses being of a delayed phase from the leading edges of said pulse amplitude modulated signals, a gate generator including a second magnetic core having a rectangular hysteresis loop with two saturated regions for producing constant width gate signals, means for applying the delayed output pulses from said delay pulse generator to said gate generator to produce said constant width gate signals, a gating circuit including a transistor having base, emitter and collector electrodes, said transistor being normally non-conductive, a third magnetic core having a rectangular hysteresis loop characteristic, leans for biasing said magnetic core to provide a flux to operate said third magnetic core in a saturated region, means for applying said gate signals to the base electrode to cause said transistor to become conductive to open said gating circuit, means for applying said amplitude modulated signals to said third magnetic core through said emitter and collector electrodes of said transistor during the interval of said gate signals to drive said third magnetic core away from its saturated region, a utilization circuit, means for applying an output signal from said third magnetic core to said utilization circuit, and means for switching said third magnetic core back to its original saturated region at the end of the interval of said gate signals to provide pulse width modulated signals at said utilization circuit variable in accordance with said amplitude modulated signals.

7. A pulse converter circuit comprising a source of pulse amplitude modulated signals, a pulse delay generator including a first magnetic core having a rectangular hysteresis loop characteristic with two saturated regions of operation and a transistor device to provide feedback means for driving said first core from one saturated region to its other saturated region, means for applying said pulse amplitude modulated signals to produce square wave output pulses from said first magnetic core with the leading edges of said pulses being of a delayed phase from the leading edges of said pulse amplitude modulated signals, a gate generator including a second magnetic core having a rectangular hysteresis loop with two saturated regions and a transistor device to provide feedback means for driving said second core from one saturated region to the other saturated region, said gate generator producing constant width gate signals, means for applying the delayed output pulses from said delay pulse generator to said gate generator to produce said constant width gate signals, a gating circuit including a transistor device, said transistor device including base, emitter and collector electrodes, said transistor device being normally non-conductive to provide a high impedance path between said emitter and collector electrodes, a third magnetic core having a rectangular hysteresis loop characteristic, means for biasing said third magnetic core to provide a flux to operate said third magnetic core in a saturated region, means for applying said gate signals to said base electrode to cause said transistor to become conductive and provide a low impedance path between said emitter and collector electrodes to open said gating circuit, means for applying said amplitude modulated signals to said third magnetic core through said low impedance path between said emitter and collector electrodes during the interval of said gate signals to drive said third magnetic core away from its saturated region, a utilization circuit, means for applying an output signal from said third magnetic core to said utilization circuit, and means including a transistor device for switching said third magnetic core back to its original saturated region at the end of the interval of said gate signals to provide pulse width modulated signals at said utilization circuit variable in accordance with said amplitude modulated signals.

References Cited in the file of this patent

UNITED STATES PATENTS

| | | |
|---|---|---|
| 2,780,782 | Bright | Feb. 5, 1957 |
| 2,824,697 | Pittman et al. | Feb. 25, 1958 |
| 2,875,412 | Kaplan | Feb. 24, 1959 |